S. Van Rennselaer Newman,
Bean Harvester.
No. 24,482    Patented June 21, 1859.
Inventor.
S Van Rennselaer Newman
Witnesses:
Simeon Root
Alvin Wilman
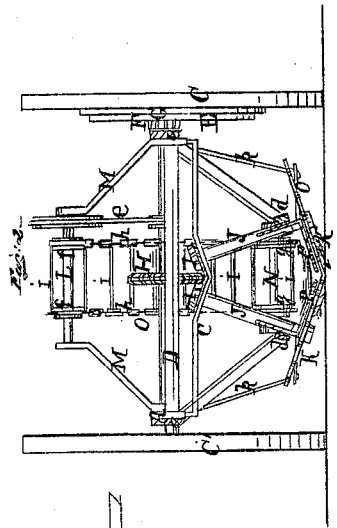
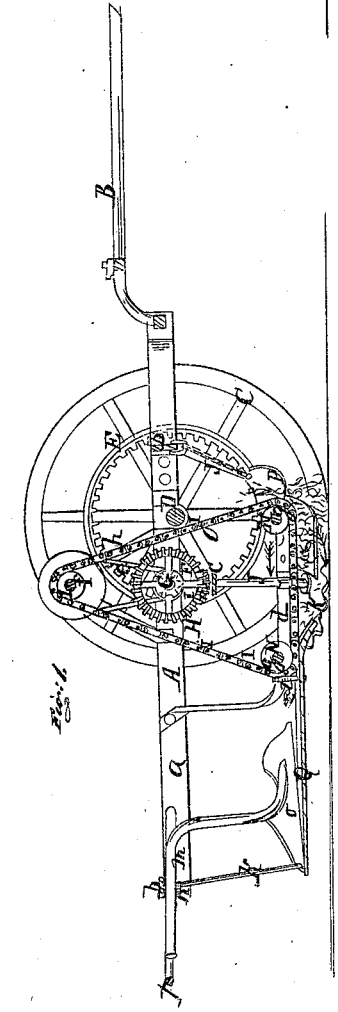
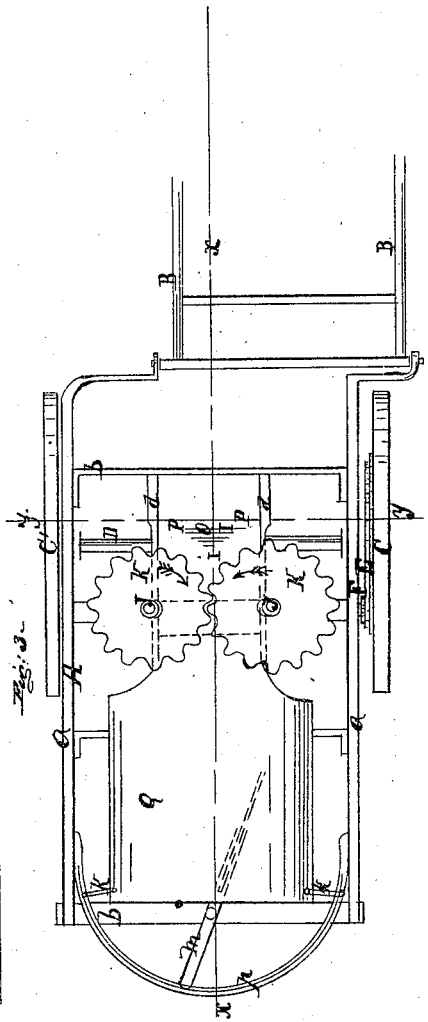

UNITED STATES PATENT OFFICE.

S. V. R. NEWMAN, OF COVINGTON, NEW YORK.

IMPROVEMENT IN MACHINES FOR HARVESTING BEANS.

Specification forming part of Letters Patent No. 24,482, dated June 21, 1859.

*To all whom it may concern:*

Be it known that I, S. VAN RENSSELAER NEWMAN, of Covington, in the county of Wyoming and State of New York, have invented a new and Improved Machine for Harvesting Beans; and I do hereby declare that the following is a full, clear, and exact description of the same, reference being had to the annexed drawings, making a part of this specification, in which—

Figure 1 is a longitudinal vertical section of my invention, taken in the line $xx$, Fig. 3. Fig. 2 is a transverse vertical section of the same, taken in the line $yy$, Fig. 3. Fig. 3 is an inverted plan of the same.

Similar letters of reference indicate corresponding parts in the several figures.

This invention consists in the employment or use of rotary sickles peculiarly arranged for cutting the bean-stalks, and using in connection with said sickles guide-plates and endless conveying-chain, platform, and discharging plate or rake, the whole being placed in a mounted frame and arranged substantially as hereinafter described, whereby the beans may be cut and discharged in gavels on the ground.

To enable those skilled in the art to fully understand and construct my invention, I will proceed to describe it.

A represents a frame, which may be formed of two parallel bars, $a$, connected by traverse-bars $bb$, and having thills B B attached to one end. This frame A is mounted on two wheels, C C′, one of which, C, is attached to the axle D, and the other, C′, allowed to rotate freely on it.

To the inner side of the wheel C a toothed rim, E, is attached concentrically. This rim is toothed on its inner periphery and gears into a pinion, F, which is placed at one end of a shaft, G, said shaft being fitted transversely in the frame A, and has a toothed wheel, H, on it at about its center. The wheel H may be termed a "double-beveled" wheel, and it gears into two bevel-pinions, I I, one at each side of it. These pinions I I are placed on the upper ends of inclined shafts J J, the upper parts of which have their bearings in a transverse bar, $c$, in the frame A, the lower bearings being in bars $dd$, the ends of which are curved upward and attached to the frame A. The shafts J J have an inclined position, one shaft having a reverse position to the other, (see Fig. 2,) and to the lower end of each shaft J a circular sickle, K, is attached. The sickles K are placed on their respective shafts at right angles, and consequently have inclined positions, as shown clearly in Fig. 2. The sickles K K are formed of circular steel plates provided with scalloped-shaped teeth, the teeth of one sickle working between those of the other, as shown clearly in Fig. 3.

L is a shaft, which has its bearings in supports M on the frame A. The shaft L is directly over and in the same plane with shaft G, and receives its motion from shaft G by means of a belt, $e$. (See Figs. 1 and 2.) On the shaft L two pulleys $ff$ are placed, and similar pulleys, $g$, are fitted on shafts N N, which are placed on the bars $dd$—one near their front and the other near their back ends, as shown clearly in Fig. 1. Around the pulleys $fg$ of the three shafts L N N an endless chain of rods, O, works. This device is formed of two chains, $hh$, with transverse rods $i$ attached at suitable distances apart. The lower portion of the chains of rods O is about parallel with the bars $dd$ and is quite near the sickles K K.

P P are guide-plates, the front ends of which are of curved form, and are suspended by chains $j$ from a traverse-bar, $b$, of the frame. The back parts of the guide-plates are pivoted to the bars $dd$. The guide-plates P P are somewhat inclined, corresponding to the inclination of the sickles K K, and the space between the sickles is in line with the space or "bite" of the sickles.

Q is a platform, the back part of which is suspended by rods $kk$ from the back of the frame A, the front end of the platform being suspended by rods $ll$ from the bars $dd$.

To the back traverse-bar $b$ of the frame A a rake-handle, $m$, is attached by a swivel connection, $n$, the rake $o$ being of any proper form, (a simple plate would answer,) the rake or plate resting on the platform. (See Fig. 1.) The back end of the frame A has a semicircular rod, $p$, attached, which serves as a handle for the operator.

The operation is as follows: As the machine is drawn along the sickles K K are rotated in the direction indicated by the arrows through the medium of the gearing E F H I I, and the bean-stalks will be cut thereby near the surface of the ground, the machine being so guided that the row of beans will be in line with the bite of the sickles. The plates P P gather up the stalks that may be lodged or bent over, so that they will enter into the bite of the sickles and be prevented from coming in contact with and winding around the shafts J J, and the endless chain of rods O, which move in the direction indicated by arrow 1, Fig. 1, convey the stalks on the platform Q, from which they may be raked by the operator actuating the handle $m$. The operator or attendant grasps the rod or handle $p$, and is enabled to elevate the sickles above any ordinary obstructions by simply depressing the back part of the machine. The sickles K K are rotated with considerable rapidity in order to operate effectually, as the stalks of beans are quite tough and cannot be cut by ordinary cutting devices. The rotary sickles are therefore an important feature of the invention.

Having thus described my invention, what I claim as new, and desire to secure by Letters Patent, is—

1. The employment or use of the rotary sickles K K, provided with scalloped-shaped teeth, and arranged to operate substantially as and for the purpose set forth.

2. The combination of the endless chain of rods O with the rotary sickles K K.

3. The combination of the rotary sickles K K, endless chain of rods O, platform Q, with or without the rake $o$, placed in a mounted frame, A, and arranged for joint operation substantially as and for the purpose set forth.

S. VAN RENSSELAER NEWMAN.

Witnesses:
SIMEON ROOD,
ALVIN WELLMAN.